US008001229B2

(12) United States Patent
Kaneda et al.

(10) Patent No.: US 8,001,229 B2
(45) Date of Patent: *Aug. 16, 2011

(54) OPERATION MANAGEMENT SYSTEM, MANAGEMENT APPARATUS, MANAGEMENT METHOD AND MANAGEMENT PROGRAM

(75) Inventors: Yasunori Kaneda, Sagamihara (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,556

(22) Filed: Oct. 2, 2009

(65) Prior Publication Data

US 2010/0023619 A1 Jan. 28, 2010

Related U.S. Application Data

(63) Continuation of application No. 11/979,094, filed on Oct. 31, 2007, now Pat. No. 7,617,306, which is a continuation of application No. 10/353,921, filed on Jan. 30, 2003, now Pat. No. 7,305,463.

(30) Foreign Application Priority Data

Apr. 26, 2002 (JP) ................................. 2002-125173

(51) Int. Cl.
*G06F 15/173* (2006.01)
(52) U.S. Cl. .......................... 709/223; 709/224; 711/162
(58) Field of Classification Search .................. 709/223, 709/224; 711/162
See application file for complete search history.

(56) References Cited

U.S. PATENT DOCUMENTS

| 5,499,188 | A | 3/1996 | Kline, Jr. et al. |
| 5,832,503 | A | 11/1998 | Malik et al. |
| 5,974,562 | A | 10/1999 | Townsend et al. |
| 6,041,349 | A | 3/2000 | Sugauchi et al. |
| 6,122,639 | A | 9/2000 | Babu et al. |
| 6,134,631 | A | 10/2000 | Jennings, III |
| 6,199,074 | B1 | 3/2001 | Kern et al. |
| 6,253,240 | B1 | 6/2001 | Axberg et al. |

(Continued)

FOREIGN PATENT DOCUMENTS

JP 08-504532 5/1996

(Continued)

OTHER PUBLICATIONS

Fukuda, Takao, Mutual Acknowledgment of Events Information Between Different System Operation Management Tolls is Now Possible: INTAP announced [MAXI] of XML based specification Nikkei Internet technology, Nikkei BP Corp., Apr. 22, 2001, No. 46, p. 23, ISSN 1343-1676, [CS-ND-2001-00345-003].

(Continued)

*Primary Examiner* — Tonia L Dollinger
*Assistant Examiner* — Asghar Bilgrami
(74) *Attorney, Agent, or Firm* — Brundidge & Stanger, P.C.

(57) ABSTRACT

A management apparatus has a control unit for realizing a management function through a comprehensive process of characteristic information of a storage apparatus, a connecting apparatus and a computer. The management apparatus also has an interface for receiving characteristic information from the storage apparatus, connecting apparatus and computer, depending on the standard protocol among the management apparatus, storage apparatus, connecting apparatus and computer. Moreover, an integrated management apparatus is also provided for integrated management based on the result of realization of a plurality of management functions. This integrated management apparatus includes an interface for receiving the result of realization of the management function from the management apparatus, depending on the standard protocol between the management apparatus and integrated management apparatus.

15 Claims, 17 Drawing Sheets

U.S. PATENT DOCUMENTS

| | | |
|---|---|---|
| 6,360,255 B1 | 3/2002 | McCormack et al. |
| 6,697,924 B2 | 2/2004 | Swank |
| 6,714,980 B1 | 3/2004 | Markson et al. |
| 6,836,830 B1 | 12/2004 | Yamagami et al. |
| 6,920,494 B2 | 7/2005 | Heitman |
| 6,944,654 B1 | 9/2005 | Murphy et al. |
| 7,103,653 B2 | 9/2006 | Iwatani |
| 2001/0042118 A1 | 11/2001 | Miyake et al. |
| 2001/0054093 A1 | 12/2001 | Iwatani |
| 2001/0054094 A1 | 12/2001 | Hirata et al. |
| 2003/0158920 A1 | 8/2003 | Lynch et al. |
| 2003/0191910 A1 | 10/2003 | Matsunami et al. |
| 2003/0204701 A1 | 10/2003 | Mimatsu et al. |
| 2004/0049572 A1 | 3/2004 | Yamamoto et al. |
| 2004/0054648 A1 | 3/2004 | Mogi et al. |

FOREIGN PATENT DOCUMENTS

| | | |
|---|---|---|
| JP | 9-237240 | 9/1997 |
| JP | 9-245708 | 9/1997 |
| JP | 10-64812 | 3/1998 |
| JP | 11-134306 | 5/1999 |
| JP | 2000-259590 | 9/2000 |
| JP | 2002-63063 | 2/2002 |

OTHER PUBLICATIONS

Kumagaya, Tsuneharu, Windows 2000 Security & Network, 5th: WBEM, Network Management by CIM, ASCII Network Pro, Ink. ASCII, Aug. 1, 2000, vol. 5, No. 8, pp. 130-133 [CS-ND-2002-01205-015].

Kumagaya, Tsuneharu, Windows 2000 Security & Network, 7th: Detailed explanation of SOAP, ASCII, network PRO, Ink. ASCII, Oct. 1, 2000, vol. 5, No. 10, pp. 114-117, [CS-ND-2003-00070-009].

Data Center and Developing Storage Network: Mark Carlson interview, Computopia Computopia, Inc., Computer Age, Oct. 1, 1999, vol. 34, No. 397, pp. 16-21, ISSN 0010-4906. [CS-ND-2000-00818-002].

Network Management of Internet Age: Network Management Circumstance of a Next Generation Supporting Internet Business, SunWorld Inc. IDG Japan, Mar. 1, 2000, vol. 10, No. 3, pp. 40-48, ISSN 0918-5453, [CS-ND-2000-00231-002].

"Storage Networking Visualization What's It All About?" IBM Redbooks, Dec. 2000, M. Blunden et al, pp. 1-63.

Japanese Patent Office, English Translation of "Notification of Reasons for Refusal" of JP Patent Application No. 2002-125173 dated Jan. 19, 2009.

| VOLUME NO. | RAID GROUP | RAID LEVEL | NUMBER OF UNITS OF HARD DISK DRIVES FORMING A RAID GROUP | PAIRING CONDITION |
|---|---|---|---|---|
| 161 | 151 | RAID5 | 3 | |
| 162 | | | | |
| 163 | | | | PRIMARY 164 |
| 164 | 152 | RAID1 | 3 | SECONDARY 163 |
| 165 | | | | |

| APPARATUS NO. | CONNECTED APPARATUS | ACCESS SECURITY |
|---|---|---|
| 201 | 101 | ZONE1 |
| | 102 | ZONE2 |
| | 301 | ZONE1 |
| | 302 | ZONE2 |

211

| APPARATUS NO. | CONNECTED APPARATUS | ACCESS SECURITY |
|---|---|---|
| 202 | 103 | NONE |
| | 104 | NONE |
| | 303 | NONE |
| | 304 | NONE |

| LOGICAL VOLUME NO. | VOLUME NO. |
|---|---|
| 361 | 161 |
| 362 | |
| 363 | 163, 164 |
| 364 | 162, 165 |

316

| LOGICAL VOLUME NO. | FREE SPACE |
|---|---|
| 361 | 50GB |
| 362 | 100GB |
| 363 | 10GB |
| 364 | 200GB |

317

| DATABASE TABLE NAME | LOGICAL VOLUME NO. |
|---|---|
| LOG | 361 |
| ACCOUNT | 363 |
| TEMP | 364 |

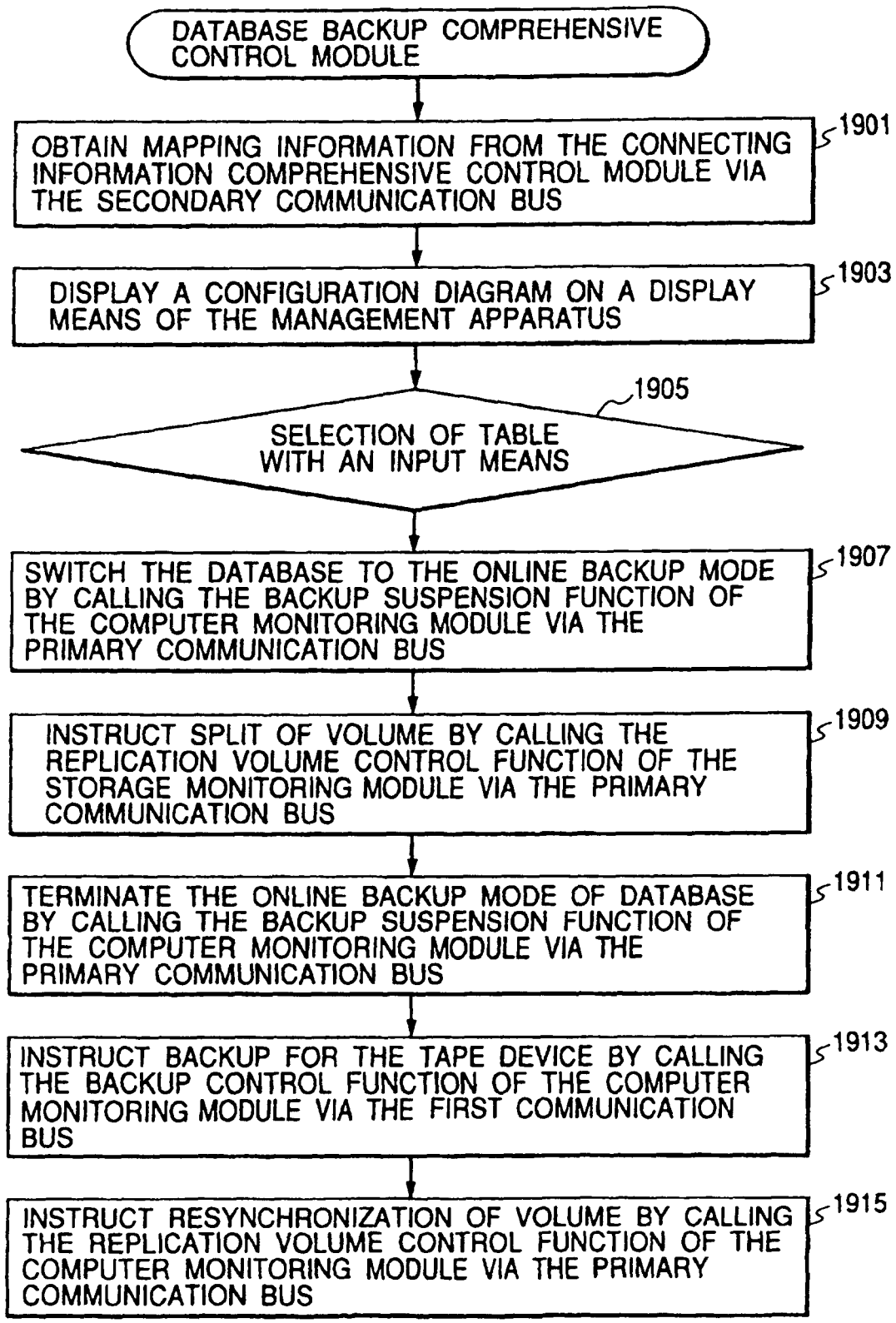

1

OPERATION MANAGEMENT SYSTEM, MANAGEMENT APPARATUS, MANAGEMENT METHOD AND MANAGEMENT PROGRAM

CROSS-REFERENCE TO RELATED APPLICATION

The present application claims priority from Japanese Patent Application No. 2002-125173, filed Apr. 26, 2002 and is a continuation of application Ser. No. 11/979,094, filed Oct. 31, 2007, now U.S. Pat. No. 7,617,306, which is a continuation of application Ser. No. 10/353,921 filed Jan. 30, 2003, now U.S. Pat. No. 7,305,463, the contents of which are incorporated herein by reference.

BACKGROUND OF THE INVENTION

The present invention relates to an operation management apparatus in an information processing system and particularly to an operation monitoring system and operation management system under the condition that a storage apparatus is configured using a network such as a fiber channel and Ethernet (Ethernet is the registered trade mark of Fuji Xerox Co., Ltd.).

A computer and a storage apparatus used in an information processing system have been connected using ATAPI (ATA Packet Interface) and SCSI (Small Computer System Interface). In the ATAPI, only two storage apparatuses of a master device and a slave device can be connected to only one cable because of its specification and moreover since the connection distance is short, the ATAPI has generally been used for connection of storage apparatus (mainly hard disk and CD-ROM) in the computer. The SCSI is specified with several specifications and eight devices in maximum may be connected with a daisy chain in the SCSI using the data bus width of eight bits. The SCSI has been used, in the computer system, as the major interface for connecting external storage apparatuses. However, with the connection distance and the limitation on the maximum configuration which is determined with electrical characteristics, it is now very difficult to configure a large scale storage system.

In these years, therefore, an information processing system has often been established using a network such as fiber channel and Eathernet because a storage system is increased in the physical size and an information processing system is further complicated. Particularly, a storage network which has been formed using a fiber channel is widely known as a SAN (Storage Area Network). In the storage network using the fiber channel and Ethernet, a more complicated system for wider area can be configured because it is possible to use various apparatuses such as switching device, hub and router or the like in comparison with the case where the ATAPI and SCSI are used.

For operation management of a more complicated storage system, it is essential to form an operation management system and an operation management method which can realize monitoring and controlling processes through effective comprehensive operation of storage apparatus, connecting apparatus and computer.

FIG. 2 illustrates a profile of the operation management in the prior art. Since storage apparatus, connecting apparatus and computer respectively have the inherent interfaces (interfaces A, B, C in the case of FIG. 2), the comprehensive control module includes the respective interfaces (interfaces A, B, C in the case of FIG. 2) of the storage apparatus, connecting apparatus and computer and the respective comprehensive control modules (operation management applications) also include inherent interfaces (interfaces D, E, F in the case of FIG. 2). The integrated control module (moreover, the host operation management application) is requested to include respective interfaces (interfaces D, E, F in the case of FIG. 2) for comprehensive operation with the respective interfaces of the comprehensive control module. Moreover, for the comprehensive operation with the other comprehensive control modules, respective comprehensive control modules are requested to perform the comprehensive process via the provided interfaces.

As described above, the operation management system of the prior art has no mutual connection capability among the operation management applications because two interfaces of the first interface for the apparatus as the operation management object and the second interface provided with the operation management application which is realized using the first interface are not specified simultaneously.

SUMMARY OF THE INVENTION

An object of the present invention is to provide higher mutual connection capability of the operation management application by specifying the first interface and the second interface.

In order to solve the object described above, a preferred embodiment of the present invention proposes an operation management system comprising a computer, a storage apparatus for storing write information or read information to the computer, a connecting apparatus for connecting the computer and the storage apparatus and a management apparatus for management of the computer, storage apparatus and connecting apparatus. Here, the management apparatus comprises a control unit to realize the management function through comprehensive process of the characteristic information of the storage apparatus, connecting apparatus and computer and an interface to receive the characteristic information from the storage apparatus, connecting apparatus or computer depending on the standard protocol between the management apparatus and storage apparatus and between the storage apparatus and computer.

Moreover, in the other embodiment of the present invention, the operation management system described above comprises an integrated management apparatus for the integrated management depending on the result of realization of a plurality of management functions and the integrated management apparatus also comprises an interface to receive the result of realization of the management function from the management apparatus depending on the standard protocol between the management apparatus and integrated management apparatus. In addition, the management apparatus comprises an interface to transmit the result of realization of the management function to the integrated management apparatus depending on the protocol.

In the other embodiment of the present invention, the management apparatus comprises a control unit to realize the management function by comprehensive process of the characteristic information of the storage apparatus, connecting apparatus and computer and an interface to receive the characteristic information from the storage apparatus, connecting apparatus and computer depending on the standard protocol between the management apparatus and storage apparatus and between the storage apparatus and computer. Moreover, the operation management system comprises the management apparatus for integrated management based on the result of realization of a plurality of management functions and the integrated management apparatus comprises an interface to receive the result of realization of the management function from the management apparatus depending on the standard protocol between the management apparatus and integrated management apparatus. In addition, the management apparatus comprises an interface to transmit the result of realization of management function to the integrated management apparatus depending on the protocol.

In the other embodiment of the present invention, a management apparatus comprises a control unit to realize the management function through comprehensive process of the characteristic information of the storage apparatus, connecting apparatus and computer and an interface to transmit and receive the result of realization of the management function among a plurality of management apparatuses depending on the standard protocol among a plurality of management apparatuses.

In the other embodiment of the present invention, the operation management system comprises a plurality of integrated management apparatuses for integrated management based on the result of realization of a plurality management functions. Here, the integrated management apparatus comprises an interface to transmit and receive the result of integrated management among a plurality of integrated management apparatuses depending on the standard protocol among a plurality of integrated management apparatuses. Moreover, the management apparatus comprises an interface to transmit the result of realization of management function to the integrated management apparatus depending on the protocol.

In the embodiment described above, it is more preferable that the characteristic information is expressed as CIM/XML and the control unit realizes the management function depending on the procedures specified with the CIM Operation over XML/HTTP.

Moreover, in the embodiment described above, it is more preferable that the result of realization of management function is expressed as XML and the integrated management apparatus is integrally administrated depending on the procedures specified with the SOAP.

BRIEF DESCRIPTION OF THE DRAWINGS

FIG. 8 is a diagram illustrating apparatus connecting information of the switch monitoring apparatus.

FIG. 11 is a diagram illustrating logical volume configuration information, logical volume free space information and database table allocation information of the computer monitoring apparatus.

FIG. 19 is a flowchart illustrating operation of a database backup comprehensive control module.

DESCRIPTION OF THE PREFERRED EMBODIMENTS

First Embodiment

Figure 1:
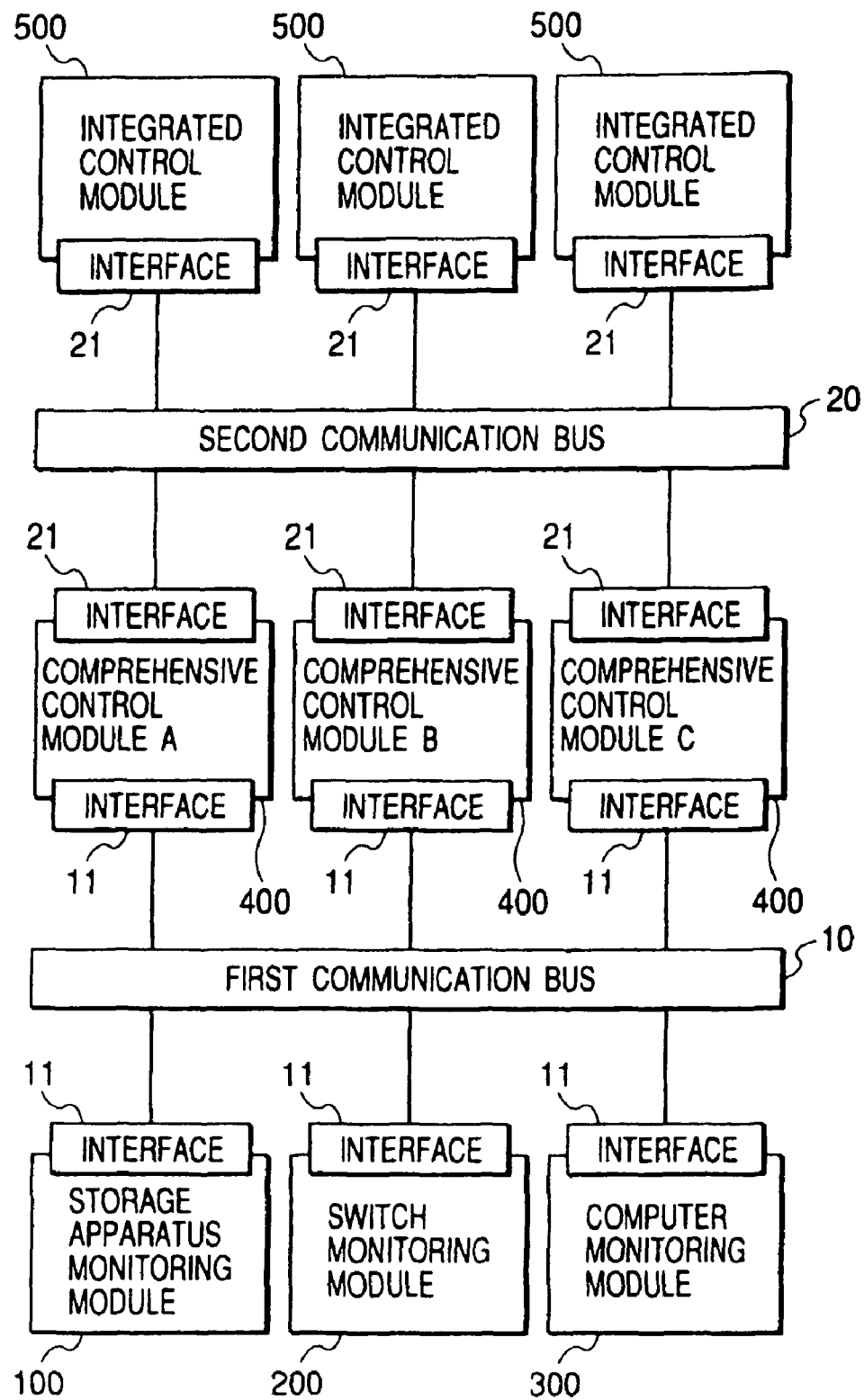
FIG. 1 is an architecture diagram of an operation management system as a preferred embodiment of the present invention.
Figure 2:
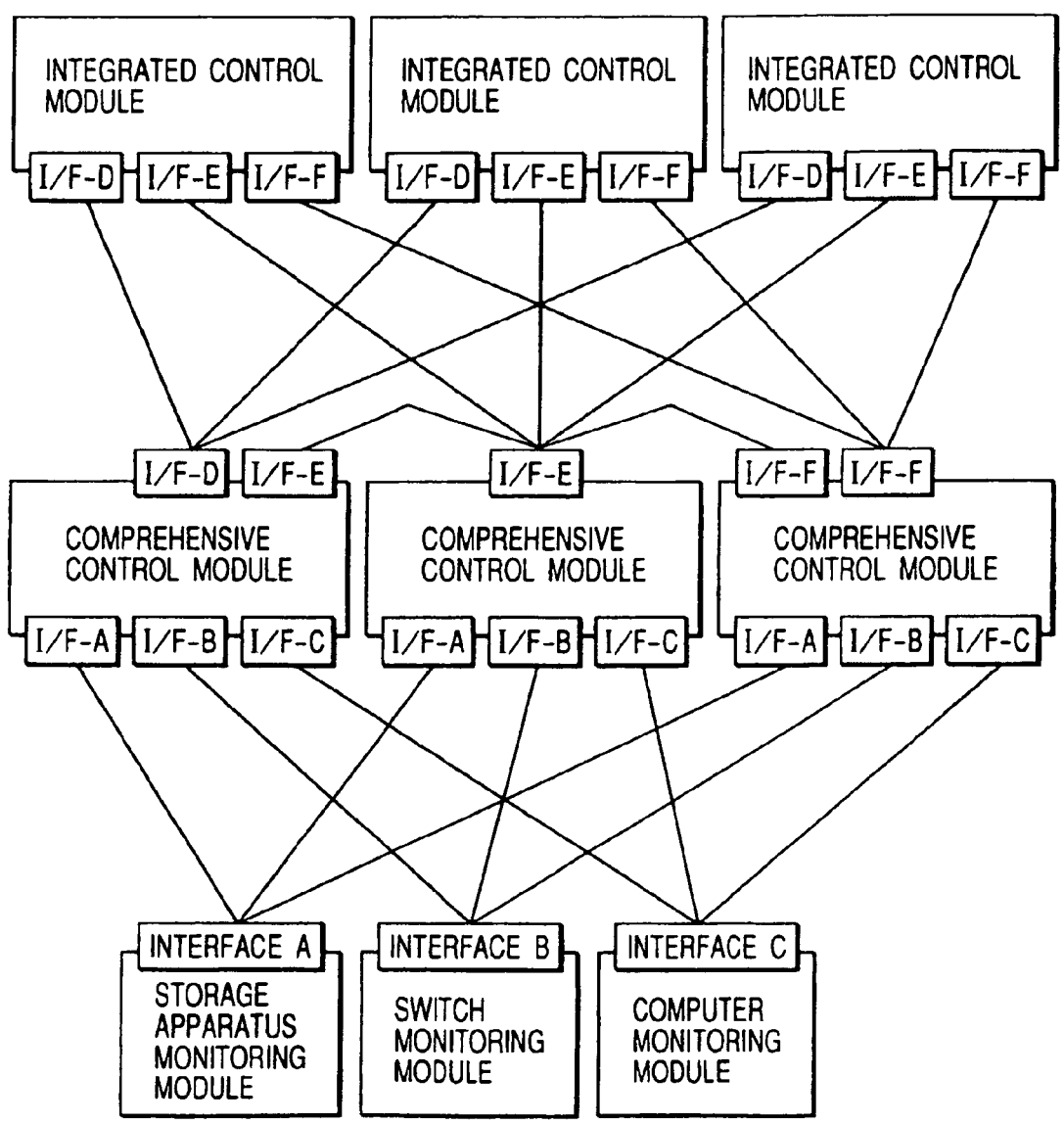
FIG. 2 is an architecture diagram of an operation management system of the prior art.

FIG. 1 is an architecture diagram of an embodiment of the present invention. An operation management system in an embodiment of the present invention respectively provides interfaces 11 to three modules for monitoring and controlling a storage apparatus, a connecting apparatus and a computer, namely, a storage monitoring module 100, a switch monitoring module 200 and a computer monitoring module 300 and then connects these interfaces to a first communication bus 10. A comprehensive control module 400 to realize comprehensive monitoring and controlling operations using the storage monitoring module 100, switch monitoring module 200 and computer monitoring module 300 is given an interface 11 and is connected to the first communication bus 10. The comprehensive control module 400 is moreover given an interface 21 and is connected to a second communication bus 20. In addition, the comprehensive control module 400 realizes comprehensive processes with the other comprehensive control module 400 through connection with the second communication bus 20 via the interface 21. Moreover, an integrated control module 500 which realizes comprehensive monitoring and controlling operations using a plurality of comprehensive control modules 400 is also provided with the interface 21 and is connected to the second communication bus 20.

Figure 3:
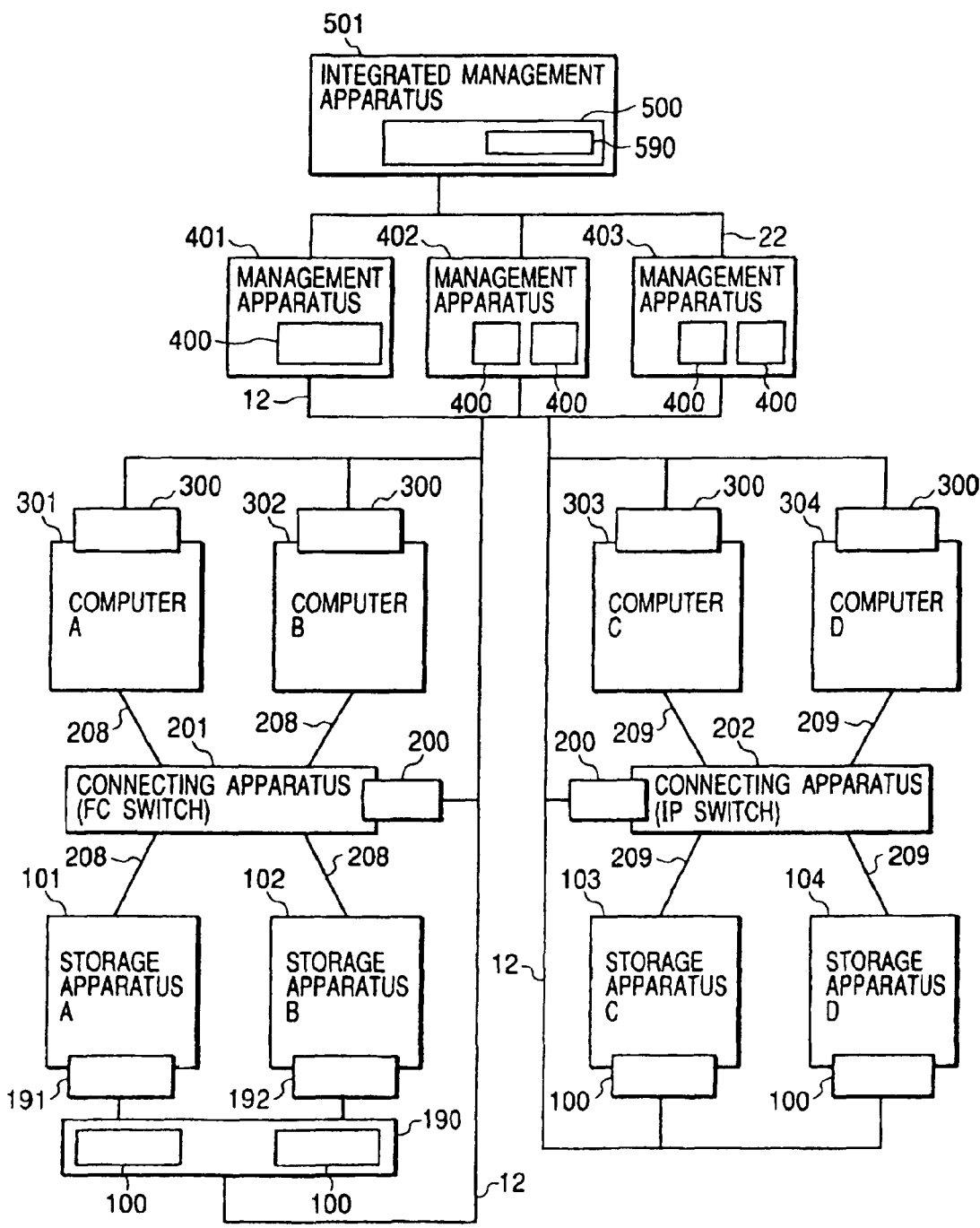
FIG. 3 is a diagram illustrating a computer system as a preferred embodiment of the present invention.

An example of configuration of a computer system in which the architecture of an embodiment of the present invention illustrated in FIG. 1 is mapped to the computer system is illustrated in FIG. 3. The computer system of FIG. 3 is configured with four storage apparatuses 101 to 104, two connecting apparatuses (FC switch 201 and IP switch 202) and four computers 301 to 304. The FC switch 201 is connected to the storage apparatuses 101, 102 and computers 301, 302 using a fiber channel 208. The apparatus connected to the FC switch 201 includes a fiber channel port for connection to the fiber channel. The IP switch 202 is connected to the storage apparatuses 103, 104 and computers 303, 304 using the Ethernet 209. The apparatus connected to the IP switch 202 includes the Ethernet port for connection to the Ethernet.

The storage apparatuses 103 and 104 are respectively provided with the storage monitoring module 100. The storage apparatuses 101 and 102 are respectively provided with the storage monitoring apparatuses 191 and 192 which are inherent to the storage apparatus. The storage apparatuses 103 and 104 are respectively provided with a monitoring and conversion apparatus 190 which is provided with the storage monitoring module 100 for the storage apparatuses 101 and 102. The FC switch 201 and IP switch 202 are respectively provided with the switch monitoring module 200. The computers 301 to 304 are respectively provided with the computer monitoring module 300. In FIG. 3, the switch monitoring module 200 and computer monitoring module 300 are described as the apparatuses to be provided for respective apparatuses but these may also be realized, like the storage apparatuses 101 and 102, by providing the monitoring and conversion apparatus. Moreover, the present invention can also be realized under the condition that a monitoring and conversion apparatus operates as the monitoring and conversion apparatus for a plurality of apparatuses, for example, the storage apparatus and connecting apparatus, storage apparatus and computer, connecting apparatus and computer and storage apparatus, connecting apparatus and computer, or the like.

The storage monitoring module 100, switch monitoring module 200 and computer monitoring module 300 are respectively connected with the first communication bus 12 and are also connected to the three management apparatuses 401 to 403. The management apparatuses 401 to 403 are respectively provided with comprehensive control module 400. In FIG. 3, three management apparatuses are respectively provided with the comprehensive control module 400 but the present invention can also be realized by providing a plurality of comprehensive control modules 400 to only one management apparatus.

Three comprehensive modules are connected with the second communication bus 22 and also connected to a management apparatus 501. The management apparatus 501 is provided with the integrated control module 500.

In an embodiment of the present invention, it is assumed that the first communication bus and the second communication bus use the Ethernet based on the Internet protocol.

Moreover, the CIM Operation over HTTP/XML is assumed as the first communication bus. Therefore, the storage monitoring module 100, switch monitoring module 200 and computer monitoring module 300 include the CIMOM (CIM Object Manager) having the apparatus information and function expressed with the data format specified with the CIM (Common Information Model). The comprehensive control module 400 obtains the information specified by the CIM from the storage monitoring module 100, switch monitoring module 200 and computer monitoring module 300 and realizes monitoring and controlling operations by calling the function (method) specified by the CIM. As the second communication bus, the SOAP is assumed. The SOAP realizes calling of the function using the XML/HTTP. Mutual functions may be used with the uniform procedures by utilizing the SOAP among the comprehensive control modules 400 and between the comprehensive control module 400 and integrated control module 500.

The storage monitoring module 100, switch monitoring module 200, computer monitoring apparatus 300, comprehensive control module 400 and integrated control module 500 can easily realize monitoring and controlling operations without dependence on the combination thereof by utilizing the standard technology (CIM Operation XML/HTTP and SOAP in this embodiment) for the first communication bus and the second communication bus. A non-standard technology may be, of course, used but it also gives difficulty in mutual connection capability which is excellent effect of the present invention.

Figure 4:
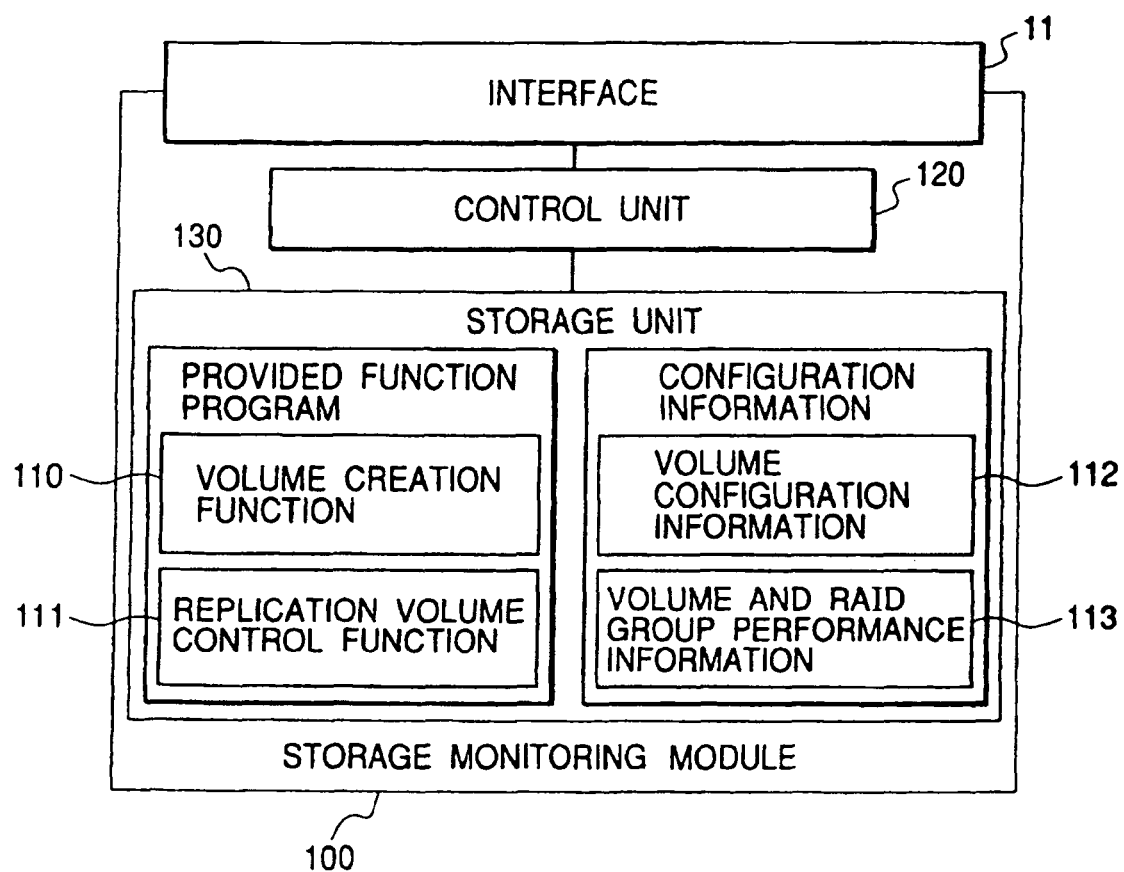
FIG. 4 is a diagram illustrating a configuration of a storage monitoring apparatus.

Here, the storage monitoring module 100 will be described. The storage monitoring module 100 may be provided to a storage apparatus itself or may be realized by disposition to the monitoring and conversion apparatus 190 with connection to the storage apparatus. Information and function required for monitoring and controlling a storage apparatus is mounted, using the CIM, to the storage monitoring module 100. In this embodiment, as illustrated in FIG. 4, a volume creation function 110 and a replication volume control function 111 are provided as the minimum necessary functions of this embodiment. Moreover, as the minimum necessary information of this embodiment, volume configuration information 112, volume and RAID group performance information 113 are prepared. The storage monitoring module 100 offers the function and information described above to the comprehensive control module 400 via the interface 11. The comprehensive control module 400 also uses the function of the storage monitoring module 100 and receives information of the storage monitoring module 100. The comprehensive control module 400 can realize monitoring and controlling processes with the common procedures without relation to the apparatus by utilizing the interface 11 corresponding to the first communication bus 12.

The volume creation function 110 is provided to create a volume of the capacity instructed from the comprehensive control module 400 in the storage apparatus. Moreover, when creation of replication volume is instructed from a management module, a volume consisting of a pair of primary volume and secondary volume can be created. In the primary volume and secondary volume provided as a pair of volumes, when such pair volumes are maintained, the secondary volume always holds a replication of the primary volume.

The replication volume control function 111 controls a pair of primary volume and secondary volume with the volume creation function. This function includes a split control for separating the primary volume and secondary volume and a resynchronization control for pairing again (wherein data of the primary volume and secondary volume are matched) the separated primary volume and secondary volume.

The volume creation function 110 and replication volume control function 111 can be realized when the control unit 120 of the storage monitoring module 100 executes a program stored in the storage unit 130 of the storage monitoring module 100. This program is recorded in a non-transitory storage medium such as a CD-ROM or the like and is then stored in a magnetic disk or the like. Thereafter, this program is loaded to a memory for execution. As a medium for recording the program, the other media except for the CD-ROM may be used. Moreover, this program may be installed to a computer from the relevant storage medium and may also be used by making access to the relevant storage medium through the network.

A couple of characteristic information of the volume configuration information 112 and the volume and RAID group performance information 113 are prepared as the information offered to the comprehensive control module 400 from the storage monitoring module 100.

Figures 5, 6:
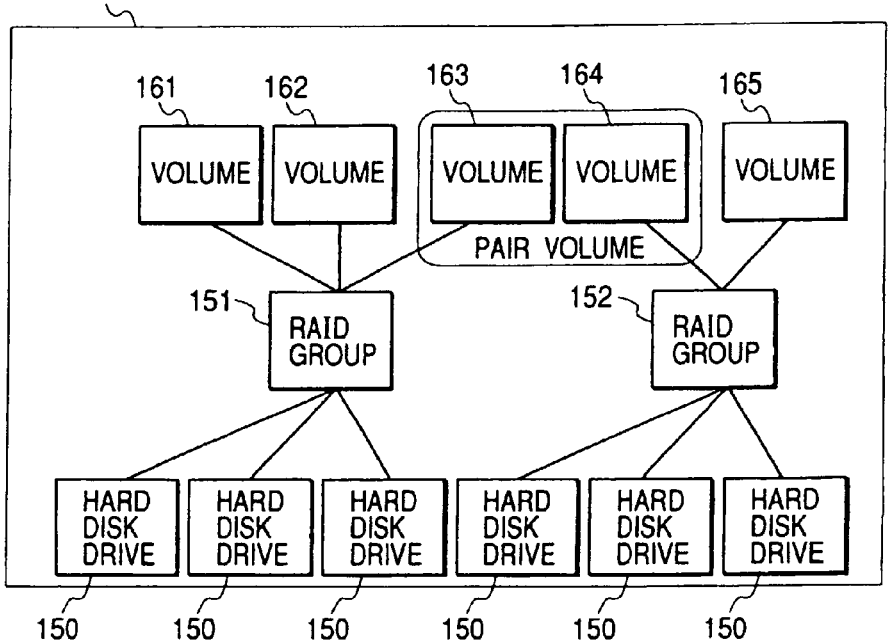
FIG. 5 is a diagram illustrating relationship among a volume, a RAID group and a hard disk drive of the storage apparatus.
FIG. 6 is a diagram illustrating volume configuration information of the storage monitoring apparatus.

FIG. 5 is a schematic diagram of volume configuration information 112 stored in the storage unit 120 of the storage monitoring module 100. The volume configuration information 112 illustrates correspondence among the volumes, RAID groups and hard disk drives. As illustrated in FIG. 5, in the storage apparatus utilizing the RAID technology, the RAID group to which the volumes provided for the computer (five volumes 161 to 165 in FIG. 5) belong, the number of hard disks included in the respective RAID groups and the algorithm of RAID which is used for management are determined by the setting (control) in the storage apparatus. The volume and RAID group performance information 113 indicates the performance (throughput, number of times of read/write operations per unit time and response time or the like) in unit of each hard disk, each RAID group and each volume in the storage apparatus.

Figure 7:
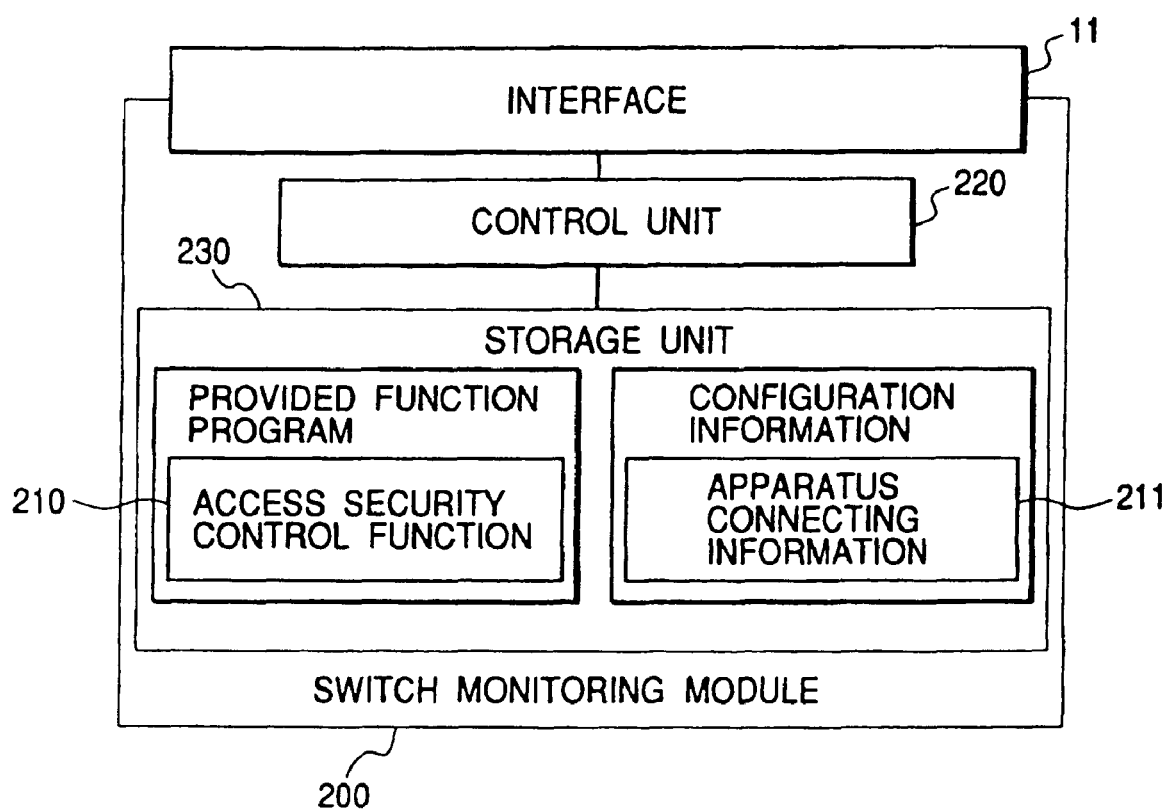
FIG. 7 is a diagram illustrating a configuration of a switch monitoring apparatus.

The switch monitoring module 200 will be explained. This switch monitoring module 200 may be provided to a connecting apparatus itself or may be realized through connection with the connecting apparatus by providing the monitoring and conversion apparatus. Information and function required for monitoring and controlling processes are mounted to the switch monitoring module 200 by utilizing the CIM. In this embodiment, as illustrated in FIG. 7, an access security control function 210 is also provided as the minimum necessary function for this embodiment.

The access security control function 210 can be realized when the control unit 220 of the switch monitoring module 200 executes a program stored in the storage unit 230 of the switch monitoring module 200. This program is recorded to a recording medium such as CD-ROM or the like and is then stored to a magnetic disk or the like and finally loaded to the memory for execution. Moreover, as a medium for recording the program, a storage medium except for the CD-ROM may be used. In addition, this program may be installed to the computer from the relevant storage medium or may be used by making access to the relevant storage medium through the network.

Moreover, as the minimum necessary information in this embodiment, apparatus connecting information 211 is provided. The switch monitoring module 200 offers the function and information described above to the comprehensive control module 400 via the interface 11. The comprehensive control module 400 can realize monitoring and controlling processes in the common procedures without dependence on the apparatus by utilizing the interface 11 corresponding to the first communication bus 10.

The access security control function 210 corresponds to a zoning function in the FC switch 201 and a VLAN (Virtual LAN) function in the IP switch 202. This function is used for setting up the connections among the particular apparatuses connected to the FC switch and IP switch. As the characteristic information offered to the comprehensive control module 400 by the switch monitoring module 200, the apparatus connecting information 211 is provided. In the case of the apparatus configuration illustrated in FIG. 1, the apparatus connecting formation of the FC switch 201 as the connecting apparatus and the apparatus connecting information of the IP switch 202 are expressed, for example, as illustrated in FIG. 8. In the case of FIG. 8, it is understood that the FC switch 201 is connected with the storage apparatuses 101, 102 and computers 301, 302 and the storage apparatus 101 and computer 301 belong to the ZONE1, while the storage apparatus 102 and computer 302 belong to the ZONE2. It is inhibited that the computer of a certain ZONE uses the storage apparatus in different ZONE. In the same manner, it can also be understood that the IP switch 202 is connected with the storage apparatuses 103, 104 and the computers 303, 304. Since the access security is not set up (controlled), the computers 303 and 304 can apparently use both storage apparatuses 103 and 104.

Figure 9:
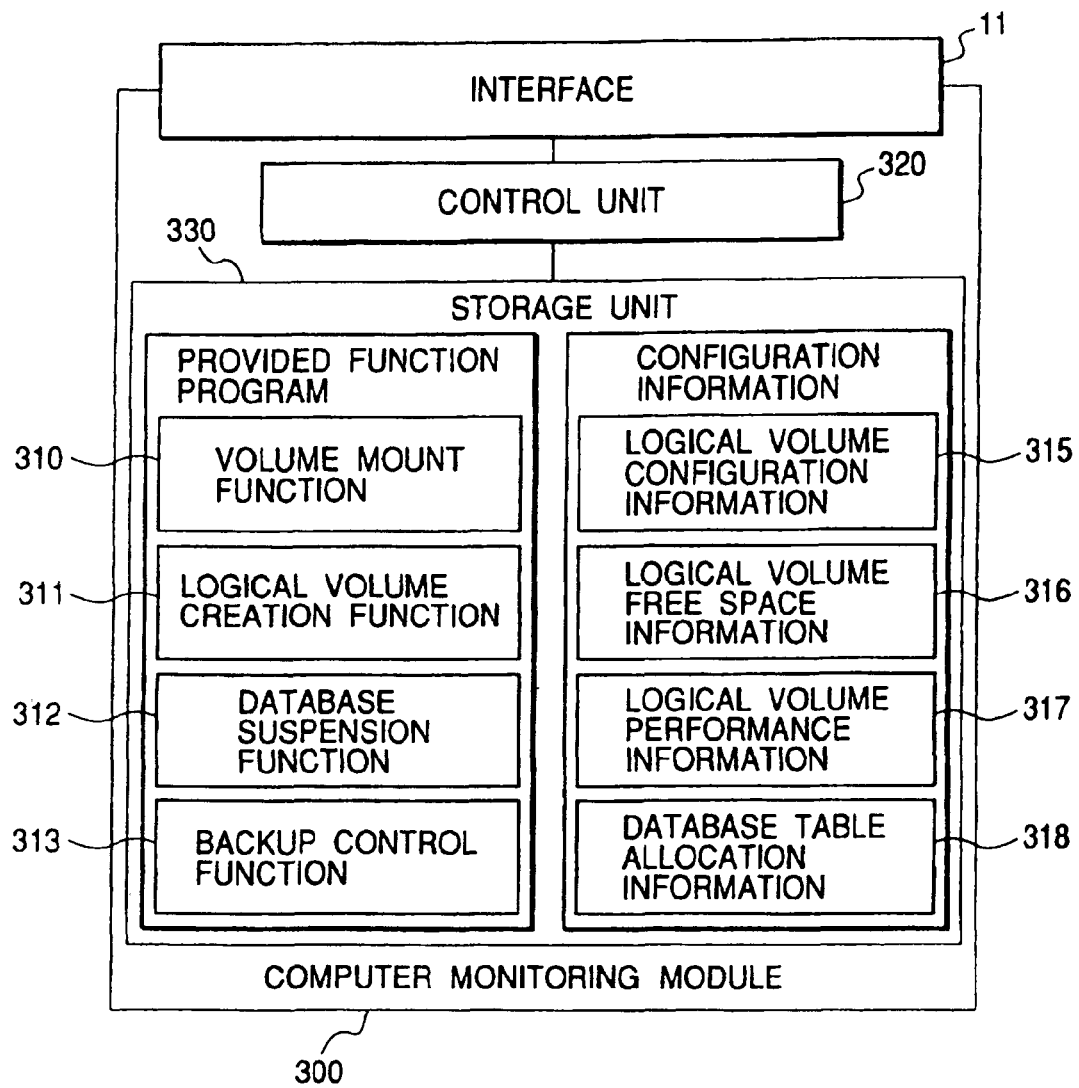
FIG. 9 is a diagram illustrating a configuration of a computer monitoring apparatus.

The computer monitoring module 300 will then be described below. The computer monitoring module 300 may be provided to the computer itself or may be realized with connection to the computer by providing a monitoring and conversion apparatus. Information and function which are required for monitoring and controlling processes of the computer are mounted to the computer monitoring module 300 using the CIM. This embodiment will be described under the assumption that a database application and a backup application are executed on the computer. Therefore, as illustrated in FIG. 9, a volume mount function 310, a logical volume creation function 311, a database suspension function 312 and a backup control function 313 are provided as the minimum necessary functions of this embodiment.

The volume mount function 310, logical volume creation function 311, database suspension function 312 and backup control function 313 are realized when the control unit 320 of the computer monitoring module 300 executes a program stored in the storage unit 330 of the computer monitoring module 300. This program is recorded to a recording medium such as CD-ROM, stored to a magnetic disk and is finally loaded to a memory for execution. Moreover, as a medium for recording the program, the other storage medium except for the CD-ROM may be used. In addition, the program may be installed to a computer from the relevant storage medium or may be used by making access to the relevant storage medium through the network.

Moreover, as the minimum necessary information in this embodiment, logical volume configuration information 315, logical volume free space information 316, logical volume performance information 317 and database table allocation information 318 are prepared. The computer monitoring module 300 provides the function and information described above to the comprehensive control module 400 via the interface 11. The comprehensive control module 400 executes monitoring and controlling processes in the standard procedures without dependence on the apparatus by utilizing the interface 11 corresponding to the first communication bus 10.

Figure 10:
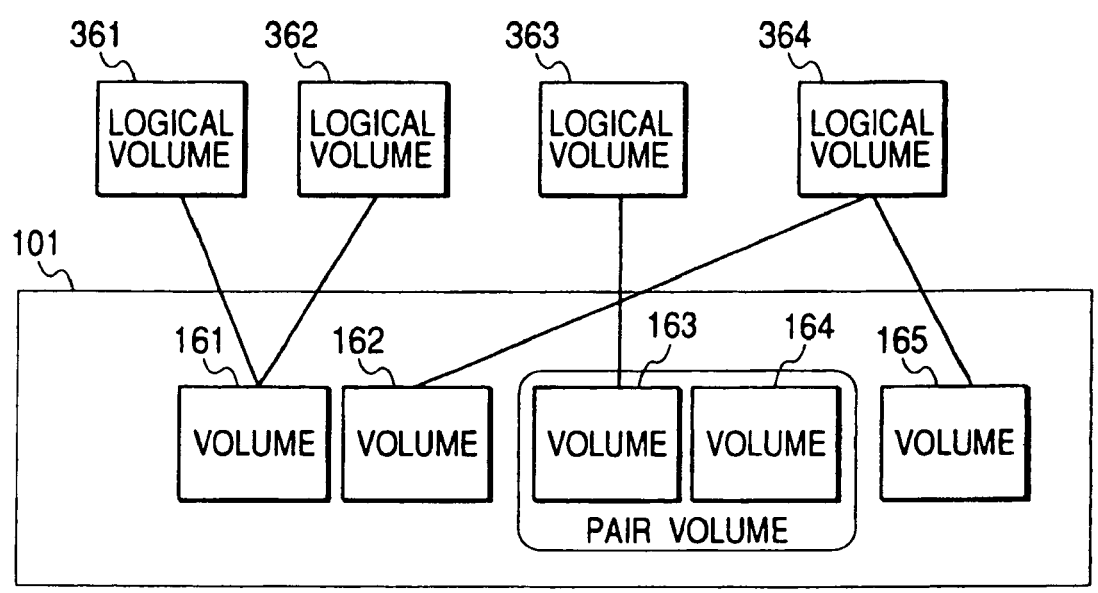
FIG. 10 is a diagram illustrating relationship between a volume of the computer monitoring apparatus and a logical volume thereof.

The volume mount function 311 is provided to use, on the computer, the volume of the storage apparatus detected from the computer. The logical volume creation function 312 is provided to create a logical volume by combining a plurality of volumes in the volume which can be used on the computer with the volume mount function 311 and to create a plurality of volumes by dividing a volume. The application on the computer executes the processes by writing and reading data to and from this logical volume. In the computer system of FIG. 3 of this embodiment, the storage apparatus 101 can be detected from the computer 301 and thereby five volumes 161 to 165 illustrated in FIG. 5 can be mounted for use. In this embodiment, the five volumes can be combined and divided as illustrated in FIG. 10 from the computer 101 for use as the logical volume. The database suspension function 312 is the control function for the database application and is provided to switch the database to the online backup mode. When the database online backup mode is selected, the database can be suspended in this timing and thereby the database backup can be obtained during operation of database. The backup control function 313 is the control function for the backup application and is provided to instruct a tape device (not illustrated) to prepare for the backup of the designated logical volume. As the characteristic information provided by the computer monitoring module 300 for the comprehensive control module 400, four information pieces of the logical volume configuration information 315, logical volume free space information 316, logical volume performance information 317 and database table allocation information 318 are provided. The logical volume configuration information 315 indicates a configuration of the logical volume which is used by the volume of storage apparatus and computer illustrated in FIG.

10. In FIG. 11, examples of logical volume free space information 316 and database table allocation information 318 in this embodiment are illustrated. The logical volume performance information 318 indicates the performance in unit of each logical volume (through put, number of times of read/write operations per unit time and response time or the like) in the computer.

Figure 12:
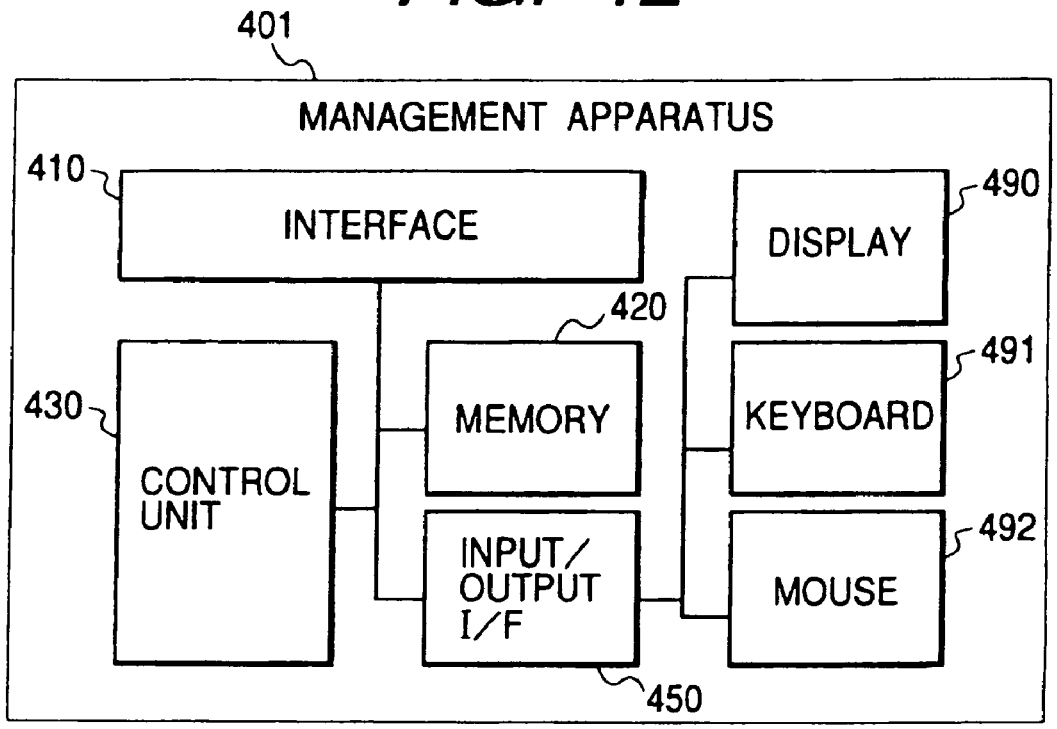
FIG. 12 is a configuration diagram of a management apparatus.

FIG. 12 is a configuration diagram of a management apparatus. The management apparatuses 401 to 403 respectively comprise an interface 411 which realizes transmission and reception of information required for management depending on the standard protocol among the storage apparatuses 101, 102, 103, 104, computers 301, 302, 303, 304 and connecting apparatuses 201, 201 and among the integrated management apparatuses 501, 502, 503, a storage unit (memory) 420 for storing various information pieces received via the interface 411 and program and data executed by the control unit 430, an input/output interface 450 for connecting a display 490, a keyboard 492 and a mouse 494 and the control unit 430 to realize a comprehensive control module 400. Moreover, the interface 411 may transmit and receive the information required for management depending on the standard protocol among a plurality of management apparatuses 401, 402, 403.

The comprehensive control module 400 realizes the management function when the control unit 430 executes the program stored in the control unit (memory) 420. This program is recorded to a non-transitory recording medium such as a CD-ROM, stored to a magnetic disk or the like and thereafter loaded to the memory for execution. Moreover, a medium for recording the program may be a recording medium other than the CD-ROM. In addition, the program may be installed to the computer from the relevant storage medium or may be used by making access to the relevant medium through the network.

The comprehensive control module 400 is a software module to realize the comprehensive functions by combining the storage monitoring module 100, switch monitoring module 200 and computer monitoring module 300. This comprehensive control module 400 executes the process on the management apparatuses (401 to 403). In this embodiment, four comprehensive control modules of the connecting information comprehensive control module, performance monitoring comprehensive control module, volume assignment comprehensive control module and database backup comprehensive module will be explained as the practical embodiments of the comprehensive control module 400.

Figure 15:
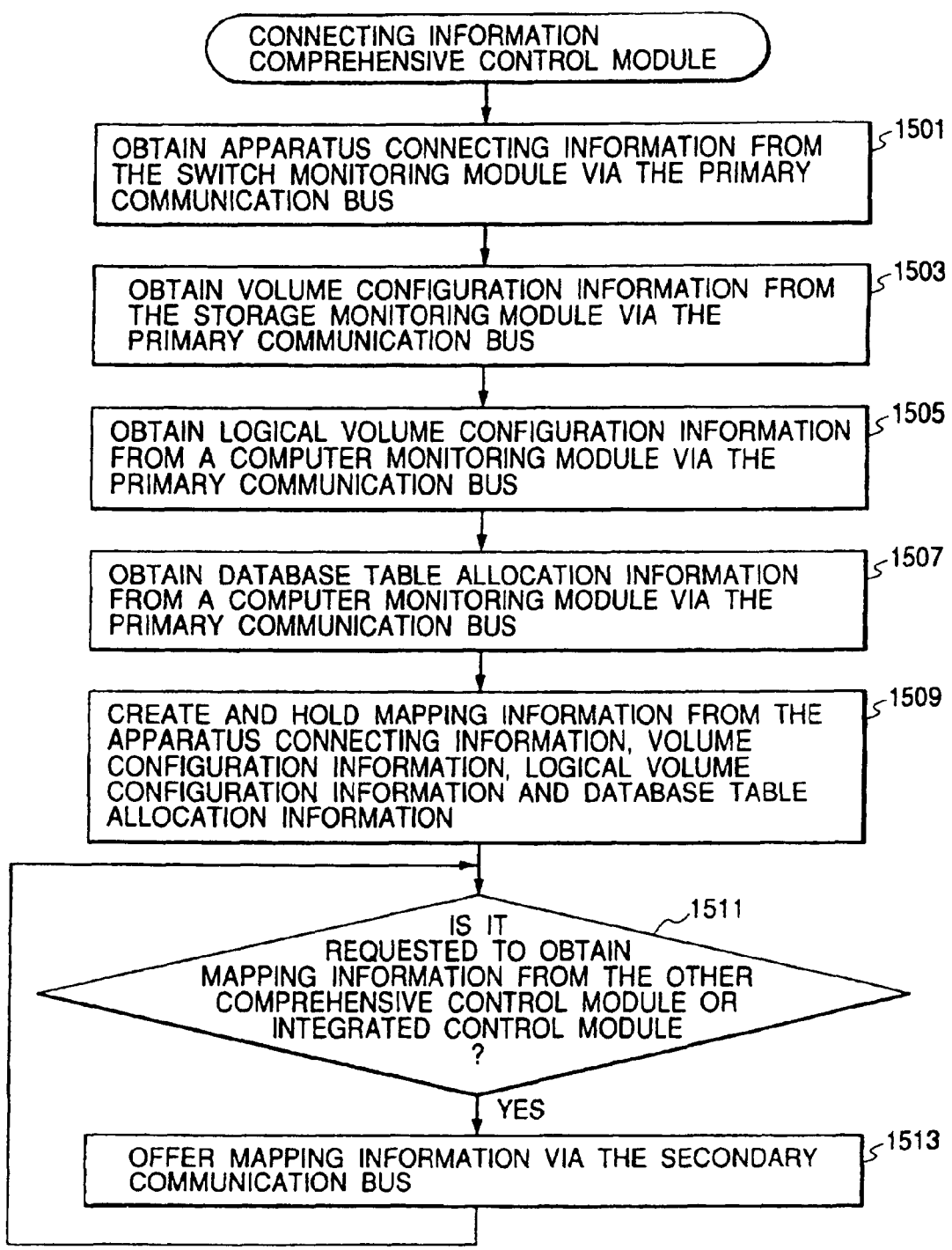
FIG. 15 is a flowchart illustrating operation of the connecting information comprehensive control module.

The connecting information comprehensive control module obtains necessary information from the storage monitoring module 100, switch monitoring module 200 and computer monitoring module 300 via the interface 11 and first communication bus and creates a mapping up to the RAID group of storage apparatus from a table used by the database application on the computer. The processes will be described with reference to the flowchart of FIG. 15.

First, apparatus connecting information 212 is obtained (1501) from the switch monitoring module 200 of the connecting apparatuses (FC switch 201 and IP switch 202 in this embodiment). Even if the FC switch 201 and IP switch 202 are apparatuses of different vendors, since the switch monitoring module 200 includes the interface 11 for the first communication bus 12, the apparatus connecting information 212 can be obtained with the standard procedures without dependence on difference of apparatuses. Next, the connecting information comprehensive control module obtains volume configuration information 112 from the storage monitoring module 100 (1503). In the configuration of FIG. 3, the volume configuration information 112 of the storage apparatuses 103, 104 is obtained from the storage monitoring module 100 of respective storage apparatuses, while the volume configuration information of the storage apparatuses 101, 102 is obtained from the storage monitoring module 100 of the monitoring and converting apparatus 190. Next, the connecting information comprehensive control module obtains logical volume configuration information 315 from the computer monitoring module 300 (1505). Moreover, this module also obtains database table allocation information 318 from the computer monitoring module 300 (1507). The connecting information comprehensive control module can detect in which hard disk drive 150 of the storage apparatus the table used by the database operating on the computer is stored from the apparatus connecting information 212, volume configuration information 112, logical volume configuration information 315 and database table allocation information 318. For example, it will be detected as described below in the case of information pieces illustrated in FIG. 6, FIG. 8 and FIG. 11. The computer 301 and storage apparatus 101 belong to the same ZONE1. The "ACCOUNT" table is stored in the LBAs (Logical Block Addresses) 100 to 500 of a logical drive 363 and this logical drive 363 is formed of a couple of volumes 163 and 164 of the storage apparatus 101. The volumes 163 and 164 form a pair-volume and the volume 163 belongs to the RAID group 151, while the RAID group 151 is the RAID5 which is configured with three units of hard disk drive. The volume 164 belongs to the RAID group 152 and the RAID group 152 is the RAID5 configured with three units hard disk drive. The "TEMP" table is stored in the LBAs 0 to 200 of the logical drive 364 and the logical drive 364 is configured with two volumes 162, 165 of the storage apparatus 101. The volumes 162 and 165 are volumes coupled with the computer 301. The volume 163 belongs to the RAID group 151 and the RAID group 151 is the RAID5 configured with three units of hard disk drive. The volume 164 belongs to the RAID group 152 and the RAID group 152 is the RAID5 configured with three units of hard disk drive. Here, it can be understood that the "ACCOUNT" table and the "TEMP" table are allocated on different logical volumes 363 and 364 on the computer 301 but the same RAID group (151 and 152) is used within the storage apparatus 101.

The connecting information comprehensive control module offers the mapping information created by the procedures described above (1509) to the other comprehensive control module 400 and integrated control module 500 via the second communication bus 22 and interface 21 (1513) when the other control module or integrated control module has issued a request to obtain the mapping information (1511).

As described above, the connecting information comprehensive control module can provide mapping information to the other comprehensive module 400 and integrated control module 500 via the second communication bus (SOAT in the case of this embodiment) by obtaining information in the procedures described above (CIM Operation over HTTP/XML in the case of this embodiment) from the storage apparatus, connecting apparatus and computer via the first communication bus and then creating the mapping information from this information. Since the connecting information comprehensive control module not only can obtain the information via the first communication bus without dependence on difference of apparatus but also provide the information via the second communication bus by specifying the first communication bus and the second communication bus, the other comprehensive control module is capable of obtaining the mapping information from the connecting information comprehensive control module and then using this information in place of generating such mapping information. Moreover, all comprehensive control modules can realize matching of the mapping information in the comprehensive control modules because these modules use the mapping information provided by the connecting information comprehensive control module. In addition, since the monitoring and controlling function can be realized with the standard procedures by specifying the first communication bus and the second communication bus, replacement can be realized easily even when a plurality of connecting information comprehensive modules of different functions are prepared.

Figure 16:
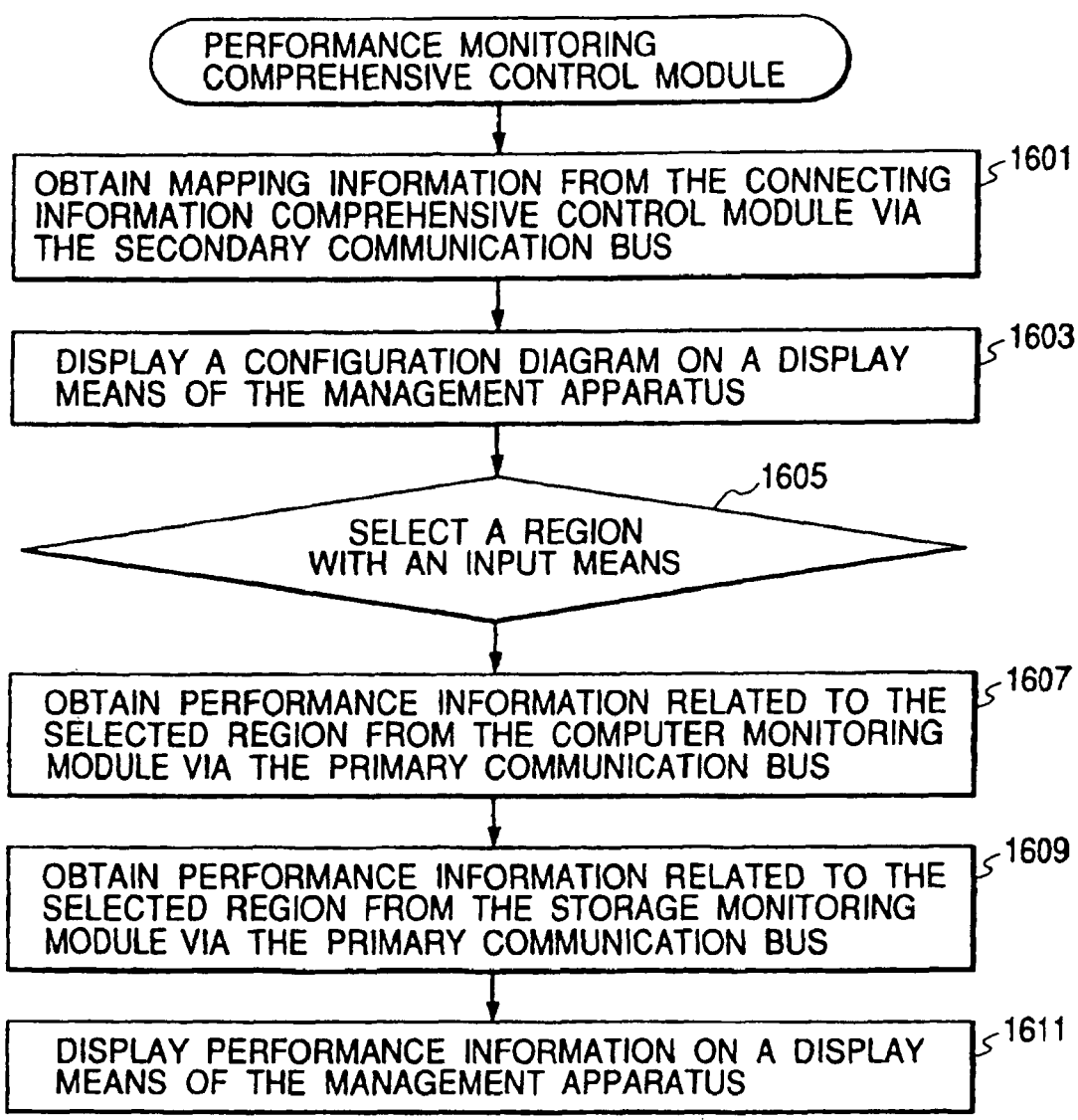
FIG. 16 is a flowchart illustrating operation of a performance monitoring comprehensive control module.

The performance monitoring comprehensive control module is provided to search a bottleneck of performance in the computer system. This search process will be described with reference to the flowchart of FIG. 16.

First, the performance monitoring comprehensive control module obtains the mapping information from the connecting information comprehensive control module via the interface 21 and second communication bus 20 (1601). The performance monitoring comprehensive control module displays a configuration diagram illustrated in FIG. 12 to the display 490 of the management apparatus based on the mapping information obtained (1603). When an administrator for operation management of computer system selects a "LOG" table (instruction by the click from an input module such as mouse) on the display module (1605), the performance monitoring comprehensive control module obtains performance information of the logical volume 361 in relation to the "LOG" table from the computer monitoring module 300 via the interface 11 and first communication bus 10 (1607) and also obtains the performance information of the volume 161 and RAID group 151 from the storage monitoring module 300 via the interface 11 and first communication bus 10 (1609) and then displays the performance information obtained to the display module provided in the management apparatus (1611). An administrator is capable of detecting an area where a load is heavy and determining a measure to be taken from the performance information displayed on the display module provided in the management apparatus.

Figure 17:
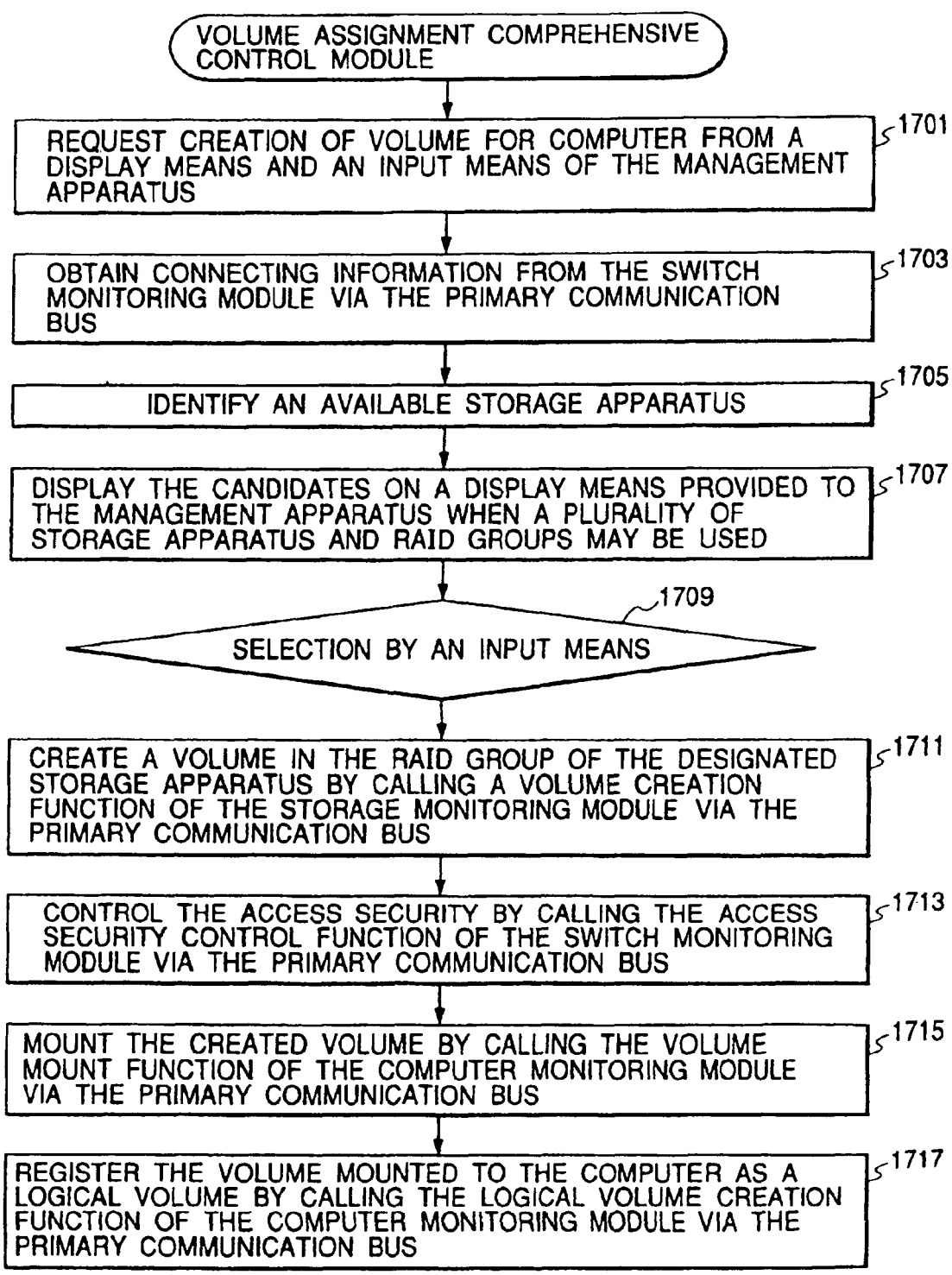
FIG. 17 is a flowchart illustrating operation of a volume assignment comprehensive control module.

The volume assignment comprehensive control module has a function to newly create a volume. This process will be explained with reference to the flowchart of FIG. 17.

An administrator can input an instruction to create a volume to the particular computer using the display 490, keyboard 491 and mouse 492 provided to the management apparatus. The volume assignment comprehensive control module obtains (1703), when it is instructed to create a volume to the particular computer of management apparatus (1701), connecting information 211 from the switch monitoring module 200 via the interface 11 and first communication bus 10 and identifies (1705) the storage apparatus to be available from the computer in which a volume must be assigned. When a plurality of storage apparatuses are available and a plurality of RAID groups may be used even in the storage apparatus, the candidates are displayed on the display module provided in the management apparatus (1707) for the selection by an administrator using the display 490 (1709).

Next, the volume creation function 110 of the storage monitoring module 100 is called via the interface 11 and first communication bus 10 in order to create a volume (1711). If necessary, the access security control function 210 of the switch monitoring module 200 is called via the interface 11 and first communication bus 10 to control (set) access security (zoning in the case of FC switch, VLAN in the case of the IP switch) via the interface 11 and first communication bus 10 in order to use the volume created only from the particular computer (1713). Next, the volume mount function 310 of the computer monitoring module 300 is called via the interface 11 and first communication bus 10 to mount the volume created to the storage apparatus (1715) and the logical volume creation function 311 is also called to use the volume mounted as the logical volume (1717).

Figure 18:
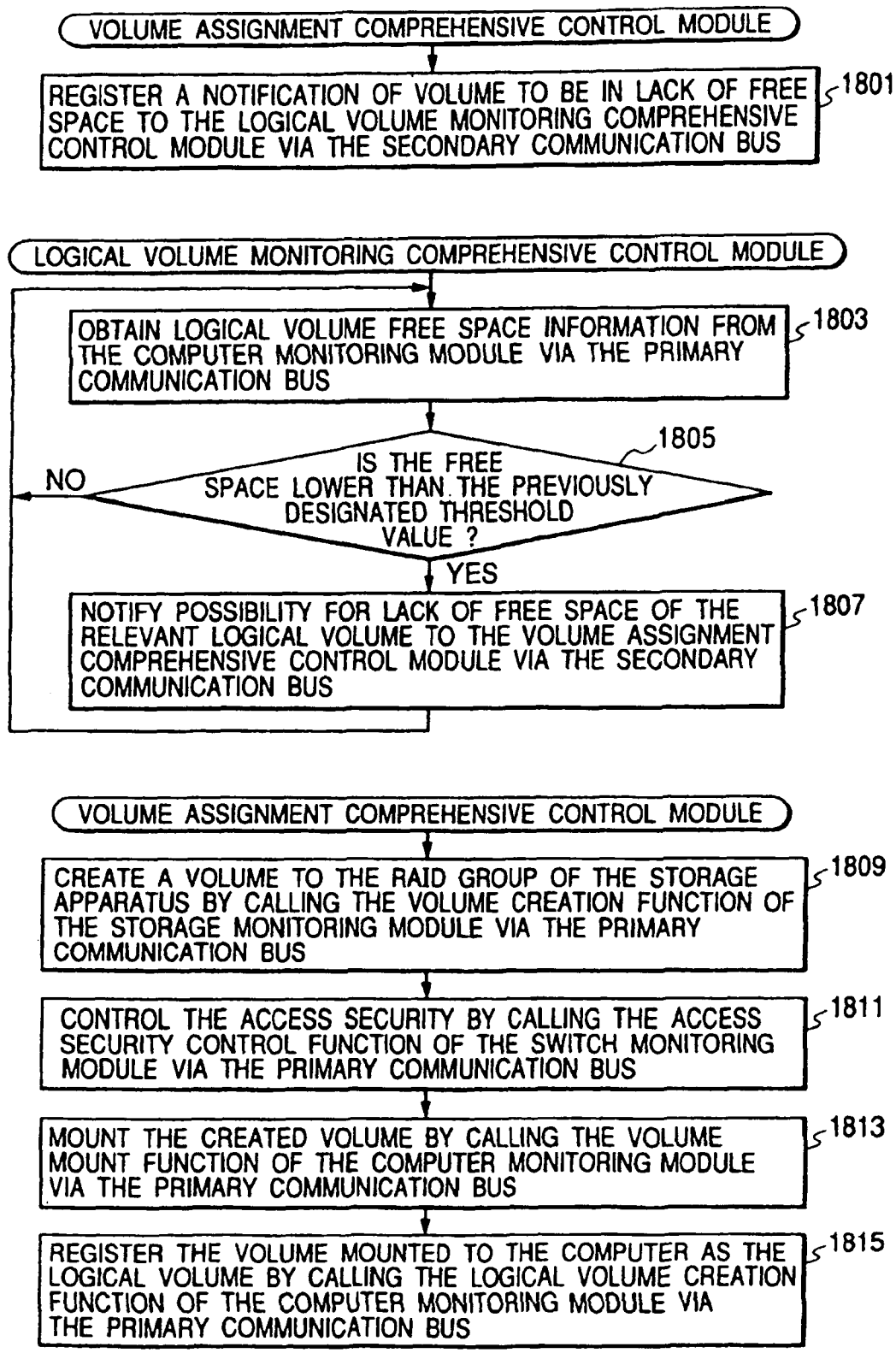
FIG. 18 is a flowchart illustrating operation in the comprehensive operations of the volume assignment comprehensive control module and a logical volume monitoring comprehensive control module.

The logical volume monitoring comprehensive control module has a function to monitor the logical volumes of the computer and detect logical volumes which exhibit lack of free capacity. When the logical volume monitoring comprehensive control module finds a logical volume which exhibits lack of free space (in practical, when capacity becomes lower than the preset threshold value) for the previously registered comprehensive control module 400, it notifies this condition via the interface 21 and second communication bus 22. The function to additionally assign the volume can be realized for the logical volume which exhibits lack of free space through comprehensive process of the logical volume monitoring comprehensive control module and volume assignment comprehensive control module described above. These processes will be described with reference to the flowchart of FIG. 18.

The volume assignment comprehensive control module previously registers the monitoring process of free space of logical volume to the logical volume monitoring comprehensive control module via the interface 21 and second communication bus 22 (1801). Accordingly, when a volume which seems to exhibit lack of free space is detected, the logical volume monitoring comprehensive control module notifies this condition to the volume assignment comprehensive control module. The logical volume monitoring comprehensive control module obtains logical volume free space information 316 from the computer monitoring module 300 via the interface 11 and first communication bus 12 with an interval of constant period in order to monitor the free space of logical volume (1803). When the free space of volume becomes lower than the preset threshold value (1805), the volume assignment comprehensive control module notifies that a volume seems to exhibit lack of free space thereof to the logical volume monitoring comprehensive control module to the logical volume monitoring comprehensive control module via the interface 21 and first communication bus 22 (1807). The logical volume monitoring comprehensive control module calls, upon reception of this notification, the volume creation function 110 of the storage monitoring module 100 to create a volume (1809). In order to use the created volume only from particular computer, if necessary, the access security control function 210 of the switch monitoring module 200 is called and then controlled (1811) via the interface 11 and first communication bus 12.

Next, the volume mount function 310 of the computer monitoring module 300 is called via the interface 11 and first communication bus 12 to mount a created volume to the storage apparatus (1813) and the logical volume creation function 311 is called to add the mounted volume to the logical volume which exhibits lack of free space (1815) in order to prevent lack of free space.

As described above, the logical volume monitoring comprehensive control module can realize monitoring of free space by monitoring the free space of logical volume via the first communication bus and notifying the result of monitoring to the other comprehensive control module via the second communication bus. For example, in the example described above, the volume assignment comprehensive control module can also realize monitoring of free space through comprehensive process with the logical volume monitoring comprehensive control module via the second communication bus even without monitoring of the free space via the first communication bus. Since the logical volume monitoring comprehensive control module can be realized with the standard sequence by specifying the first and second communication buses, replacement can easily be realized even when several logical volume monitoring comprehensive control modules and volume assignment comprehensive control modules having different functions are used.

An integrated control module through comprehensive operation of the volume assignment comprehensive control module and performance monitoring comprehensive control module will then be described. Performance information in relation to selection of the volume creation destination can also be displayed together by integrated management through the comprehensive operation of execution result of monitoring by these two modules.

Figure 13:
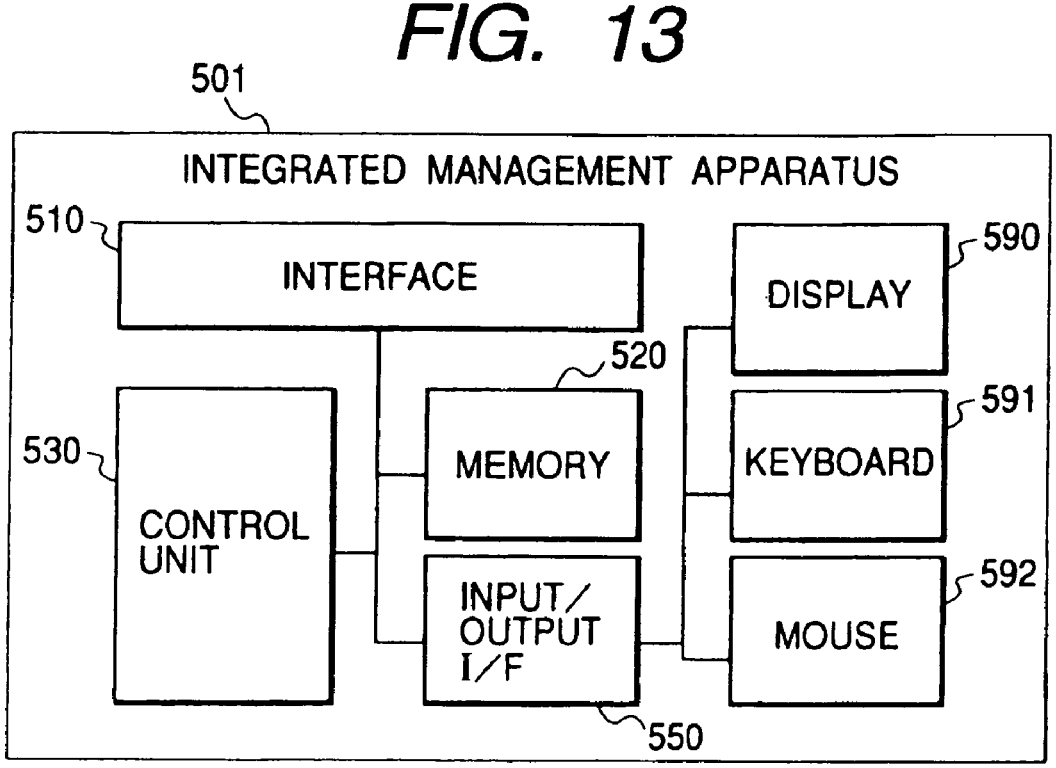
FIG. 13 is a configuration diagram of an integrated management apparatus.
Figure 14:
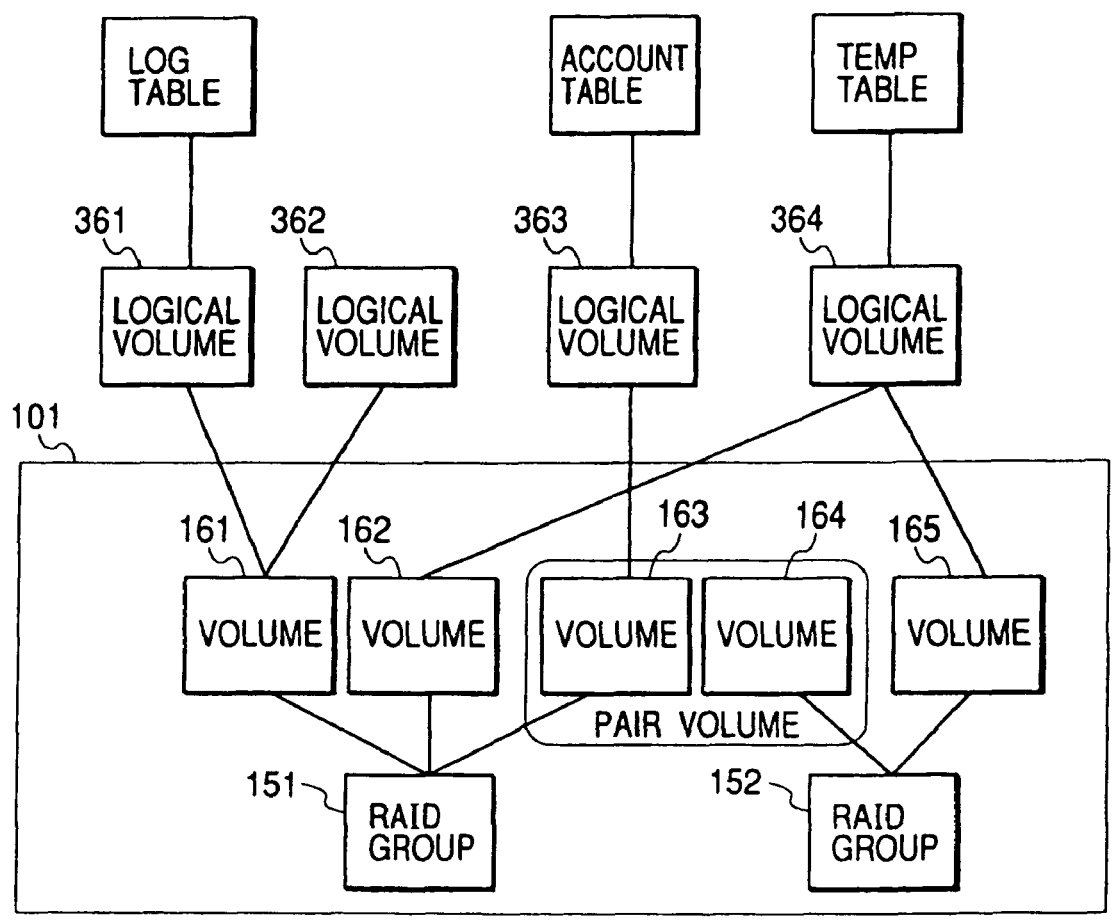
FIG. 14 is a diagram illustrating mapping information in a connecting information comprehensive control module.

FIG. 13 is a configuration diagram of an integrated management apparatus. The integrated management apparatus 501 comprises an interface 511 which enables transmission and reception of information required for management depending on the standard protocol among the management apparatuses 401, 402, 403, a storage unit 520 for storing various information pieces received via the interface 511 and program, data executed by the control unit 530, an input/output interface 450 for connecting a display 590, a keyboard 592 and a mouse 594 and a control unit 530 for realizing the integrated management module 500. Moreover, the interface 511 may also be permitted to transmit and receive the information required for management depending on the standard protocol among the integrated management apparatuses when a plurality of management apparatuses are used.

The integrated management module 500 can realize the integrated management function when the control unit 530 executes the program stored in the storage unit 520. This program is recorded to a recording medium such as CD-ROM, stored in a magnetic disk or the like and finally loaded to a memory for execution. Moreover, as the medium for recording the program, the other storage media except for CD-ROM may be used. In addition, this program may be installed to the computer from the relevant storage medium through the network. An administrator is capable of inputting an instruction to create a volume to the particular computer using the display 490, keyboard 491 or mouse 492 provided to the management apparatus. The integrated management module 500 instructs the volume assignment comprehensive control module, when it is instructed to create a volume to the particular computer of the management apparatus, to create a new volume to this computer via the interface 22 and second communication bus. Here, when a plurality of storage apparatuses may be used and a plurality of RAID groups may be used even in the storage apparatus, a list of candidates is returned. Next, the integrated management module 500 displays the performance information of the RAID group listed as the candidate of new volume creation from the performance monitoring comprehensive control module. Thereby, an administrator can judge a degree of influence of the other volumes on the volume to be created.

As described above, the integrated control module may be realized as a software module which is not specified by the first communication bus but only by the second communication bus.

The database backup comprehensive control module offers a function to realize backup of database while this database is used.

An administrator can input an instruction for backup of database table using the display 490, and keyboard 491 or mouse 492 provided in the management apparatus. The database backup comprehensive control module creates a backup of the table when it is instructed to create a backup of the database table. The process will be described with reference to the flowchart of FIG. 19.

The database backup comprehensive control module obtains mapping information from the connecting information comprehensive control module via the interface 21 and second communication bus 22 (1901). The database backup comprehensive control means (module) displays a configuration diagram as illustrated in FIG. 12 to the display module provided in the management module based on the mapping information obtained (1903). For example, when an administrator who executes operation management of the computer system instructs creation of a backup of the "ACCOUNT" table (1905), the database backup comprehensive control module instructs the database suspension function 312 of the computer monitoring module 300 to switch the database application to the online backup mode via the interface 11 and first communication bus 12 (1907). Next, the database backup comprehensive control module instructs the replication volume control function 111 of the storage monitoring module 100 to split the volumes 163 and 164 via the interface 11 and first communication bus 12 (1909). With these two procedures, the database table suspended when the split is instructed is stored in the volume 164. Next, the database backup comprehensive control module instructs the database suspension function 312 of the computer monitoring module 300 to complete the online backup mode of the database application (1911). In addition, the database backup comprehensive control module instructs the backup control function 313 of the computer monitoring module 300 to create a backup of the volume 164 to a tape device (not illustrated) via the interface 11 and first communication bus 12. Upon completion of the backup process with the backup application, the database backup comprehensive control module instructs the replication volume control function 111 of the storage monitoring module 100 to re-synchronize the volumes 163 and 164 via the interface 11 and first communication bus 12 (1915).

As described above, since the database backup comprehensive control module can have the mapping information obtained via the second communication bus to instruct the backup starting from the database table to an administrator by specifying the first communication bus and the second communication bus, to execute the backup operation for the table to which the backup is instructed, and moreover to realize the backup operation with the standard procedures for the table to which the backup is instructed by specifying the first communication bus and the second communication bus, replacement can be realized easily even when a plurality of database backup comprehensive modules having different functions are provided.

As a function of the integrated control module, a standard information storage module (standard repository) 590 may be provided. The standard information storage module 590 is provided for integrated management of the mapping information created by the connecting information comprehensive control module, performance information collected by the performance monitoring comprehensive module and free space information of logical volumes collected by the volume assignment comprehensive control module. Since each comprehensive module 400 previously stores the collected information to the standard information storage module 590 via the interface 21 and second communication bus 20, the integrated control module 500 executes the process without sending of any inquiry to each comprehensive control module 400. The standard information storage module 590 can realize its function when the control unit 530 executes the program stored in the storage unit 520. This program is assumed to be executed after it is recorded to a recording medium such as CD-ROM, then stored to a magnetic disk or the like and then loaded to a memory. Moreover, this program may be recorded to the other media except for the CD-ROM. In addition, this program may be installed to a computer from the relevant storage media and also may be used by making access to the relevant storage media through the network.

The operation management system of the present invention can assure mutual connection capability among operation management applications by simultaneously specifying two interfaces of the first interface for the devices as the operation management object and the second interface provided with the operation management application which can be realized using the first interface.

What is claimed is:

1. A system management method for a computer system including a computer, storage apparatuses, a computer monitoring module corresponding to the computer, storage monitoring modules corresponding to the storage apparatuses, and a plurality of comprehensive control modules, comprising:
   receiving, by a first comprehensive control module of the plurality of comprehensive control modules, an input of a backup target application executed by the computer, instructing the computer monitoring module to switch a mode of the backup target application to an online backup mode using a standard protocol;
   instructing, by the first comprehensive control module, a certain one of the storage monitoring modules corresponding to one of the storage apparatuses providing a primary volume, which stores data of the backup target application, to split a pair including the primary volume and a secondary volume using the standard protocol; and
   instructing, by the first comprehensive control module, the computer monitoring module to complete the online backup mode of the backup target application using the standard protocol,
   wherein the storage apparatuses include a first storage apparatus of a first vendor and a second storage apparatus of a second vendor different from the first vendor, and
   wherein the certain one of the storage monitoring modules converts the split instruction from the first comprehensive control module to a first inherent split instruction which is inherent to the first storage apparatus and which is unavailable to the second storage apparatus.

2. The system management method according to claim 1, comprising:
   creating, by a second comprehensive control module of the plurality of comprehensive control modules, mapping information indicating correspondence between the backup target application and the primary volume, based on information from the computer monitoring module;
   obtaining, by the first comprehensive control module, the mapping information from the second comprehensive control module using another standard protocol; and
   displaying, by the first comprehensive control module, the mapping information.

3. The system management method according to claim 2, wherein the computer system includes an integrated control module, and
   wherein the method further comprises:
   communicating, by the integrated control module, with the plurality of comprehensive control modules, using the another standard protocol for a management integration.

4. The system management method according to claim 3, wherein the computer system includes another integrated control module, and
   wherein the method further comprises:
   communicating, by the another integrated control module, with the comprehensive control modules, using the another standard protocol for another management integration.

5. The system management method according to claim 1, wherein the computer system includes a tape device, and
   wherein the method further comprises:
   instructing, by the first comprehensive control module, the computer monitoring module to backup data of the secondary volume to the tape device using the standard protocol, after splitting the pair; and
   instructing, by the first comprehensive control module, the certain one of the storage monitoring modules to resynchronize the pair using the standard protocol.

6. A non-transitory computer-readable media for a comprehensive control module managing a computer via a computer monitoring module and storage apparatuses via storage monitoring modules, comprising:
   a receiving code causing the comprehensive control module to receive an input of a backup target application executed by the computer;
   a first instructing code causing the comprehensive control module to instruct the computer monitoring module to switch a mode of the backup target application to an online backup mode using a standard protocol;
   a second instructing code causing the comprehensive control module to instruct a certain one of the storage monitoring modules corresponding to one of the storage apparatuses providing a primary volume, which stores data of the backup target application, to split a pair including the primary volume and a secondary volume using the standard protocol; and
   a third instructing code causing the comprehensive control module to instruct the computer monitoring module to complete the online backup mode of the backup target application using the standard protocol,
   wherein the storage apparatuses include a first storage apparatus of a first vendor and a second storage apparatus of a second vendor different from the first vendor,
   wherein the certain one of the storage monitoring modules converts the split instruction from the first comprehensive control module to a first inherent split instruction, which is inherent to the first storage apparatus and which is unavailable to the second storage apparatus.

7. The non-transitory computer-readable media according to claim 6, further comprising:
   an obtaining code causing the comprehensive control module to obtain mapping information from another comprehensive control module using another standard protocol; and
   a displaying code causing the comprehensive control module to display the mapping information,
   wherein the mapping information indicates correspondence between the backup target application and the primary volume, based on information from the computer monitoring module.

8. The non-transitory computer-readable media according to claim 7,
   wherein the comprehensive control module is used by an integrated control module providing a management integration, which communicates with the comprehensive control module using the another standard protocol.

9. The non-transitory computer-readable media according to claim 8,
wherein the comprehensive control module is used by another integrated control module providing another management integration, which communicates with the comprehensive control module using the another standard protocol.

10. The non-transitory computer-readable media according to claim 9, further comprising:
a fourth instructing code causing the comprehensive control module to instruct the computer monitoring module to backup data of the secondary volume to a tape device coupled to the computer using the standard protocol, after splitting the pair; and
a fifth instructing code causing the comprehensive control module to instruct the certain one of the certain one of the storage monitoring modules to resynchronize the pair using the standard protocol.

11. A computer system comprising:
a computer executing a backup target application;
storage apparatuses providing a primary volume which stores data of the backup target application, and a secondary volume;
a computer monitoring module receiving an instruction using a standard protocol for managing the computer;
storage monitoring modules receiving an instruction using the standard protocol for managing the storage apparatuses; and
a plurality of comprehensive control modules,
wherein a first comprehensive control module of the plurality of comprehensive control modules:
receives an input of the backup target application,
instructs the computer monitoring module to switch a mode of the backup target application to an online backup mode using the standard protocol;
instructs a certain one of the storage monitoring modules, corresponding to one of the storage apparatuses providing the primary volume, to split a pair including the primary volume and the secondary volume using the standard protocol; and
instructs the computer monitoring module to complete the online backup mode of the backup target application using the standard protocol,
wherein the storage apparatuses include a first storage apparatus of a first vendor and a second storage apparatus of a second vendor different from the first vendor, and
wherein the certain one of the storage monitoring modules converts the split instruction from the first comprehensive control module to a first inherent split instruction which is inherent to the first storage apparatus and which is unavailable to the second storage apparatus.

12. The computer system according to claim 11,
wherein a second comprehensive control module of the plurality of comprehensive control modules creates mapping information indicating correspondence between the backup target application and the primary volume, based on information from the computer monitoring module,
wherein the first comprehensive control module obtains the mapping information from the second comprehensive control module using another standard protocol, and displays the mapping information.

13. The computer system according to claim 12, further comprising:
an integrated control module that provides a management integration,
wherein the integrated control module communicates with the comprehensive control modules using the another standard protocol.

14. The computer system according to claim 13, further comprising:
another integrated control module that provides another management integration,
wherein the another integrated control module communicates with the comprehensive control modules using the another standard protocol.

15. The computer system according to claim 14, further comprising:
a tape device,
wherein the first comprehensive control module instructs the computer monitoring module to backup data of the secondary volume to the tape device using the standard protocol, after splitting the pair, and
wherein the first comprehensive control module instructs the certain one of the storage monitoring modules to resynchronize the pair using the standard protocol.

* * * * *